(No Model.)
C. C. KING.
STORM APRON FOR VEHICLES.
No. 395,749. Patented Jan. 8, 1889.
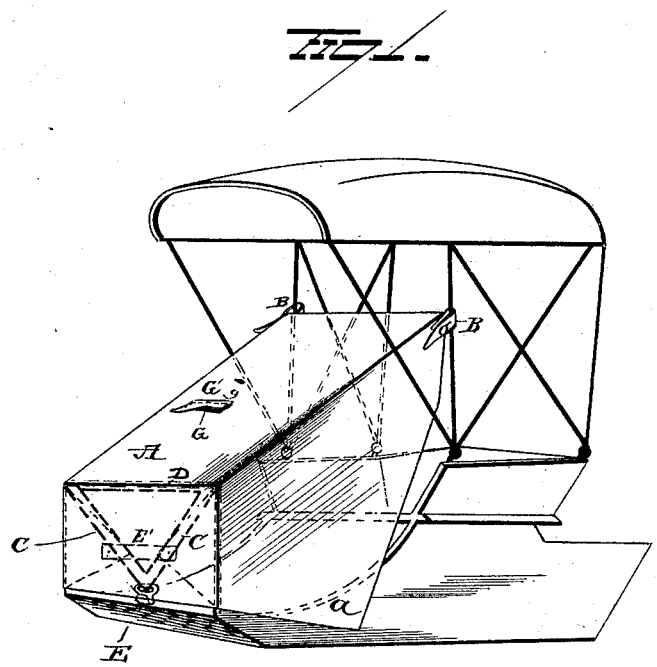
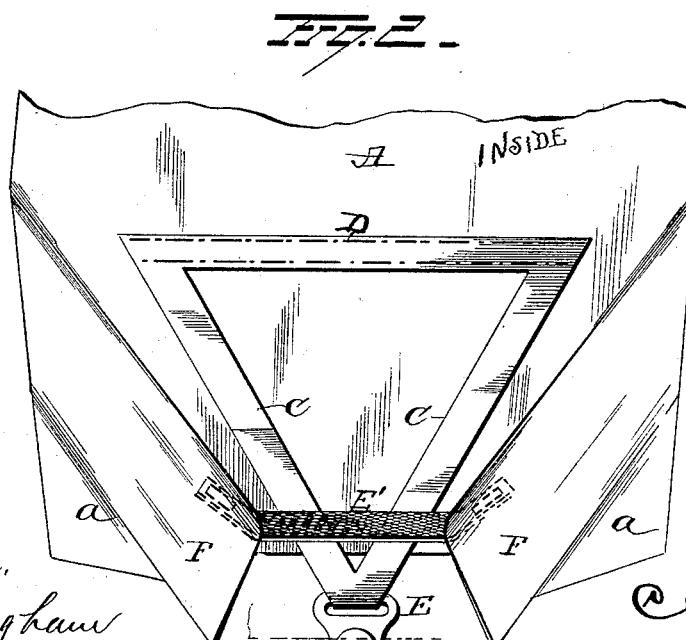
Witnesses,
E. H. Nottingham
G. F. Downing
Inventor,
C. C. King
By his Attorney
H. A. Snyman

UNITED STATES PATENT OFFICE.

CORYDON C. KING, OF PITTSTON, PENNSYLVANIA, ASSIGNOR OF TWO-THIRDS TO WISEMAN & CO., AND A. FLEISCHER, AGT., OF SAME PLACE.

STORM-APRON FOR VEHICLES.

SPECIFICATION forming part of Letters Patent No. 395,749, dated January 8, 1889.

Application filed October 6, 1888. Serial No. 287,378. (No model.)

*To all whom it may concern:*

Be it known that I, CORYDON C. KING, of Pittston, in the county of Luzerne and State of Pennsylvania, have invented certain new and useful Improvements in Storm-Aprons; and I do hereby declare the following to be a full, clear, and exact description of the invention, such as will enable others skilled in the art to which it appertains to make and use the same.

My invention relates to an improvement in storm-aprons for vehicles.

The object is to provide an apron of such construction that it will be simple in its parts and easy and convenient to arrange in position on any sized dash, and one which will fall in a gradual slope from the top braces to and over the dash and the side of the box, thereby shedding water and preventing rain or mud from being thrown by the wheels upon the occupants of the vehicle or in the front of the vehicle.

With this end in view my invention consists in certain features of construction and combinations of parts, as will be hereinafter described, and pointed out in the claims.

In the accompanying drawings, Figure 1 is a view of a carriage with my improved apron attached in position thereon; and Fig. 2 is a detached view of the securing-hook, connecting-straps, and re-enforcing-strip.

A represents the apron, it being made of water-proof material, and, preferably, of rubber cloth. The general shape of the apron may be varied; but to economize material it has been found desirable to cut it square or about square, and to then attach small pieces or triangular flaps $a$ on its side edges, adapted to lap a short distance over the side of the carriage-body.

Secured to the rear edge of the apron and at a distance apart to correspond about with the width of the carriage-top are a pair of straps, B, of the ordinary construction and adapted to pass around one of the braces of the top and be buttoned to the apron.

A re-enforcing-strip, D, is secured transversely to the under side of the apron in position to rest on the upper edge of the dash when the strips B are fastened, and thereby take the wear and strain which would otherwise necessarily be sustained by the apron itself.

Straps C, of similar material to strips D, extend from the latter and meet at a suitable distance below to receive the hook or loop E, which latter receives the lower edge of the dash and prevents the apron from being pulled back or up. Now the apron is secured forward and back and the elastic strap or gatherer E' draws the lapped portions F toward each other, according to the width of the dash, so that the apron fits snugly over the dash and is in no danger of being accidentally removed laterally any more than in any other direction. A slit or opening, G, is formed in the apron for the lines to enter, and over this is secured a flap, G', the edge of the latter being preferably secured close above the slit, with its ends $g$ stitched down for a considerable distance, so as to give all needed protection against the entrance of water through the slit or opening.

The placing of the re-enforcing-strap on the lower edge of the apron is not absolutely necessary, and might be dispensed with altogether, and also the triangular formation of straps (shown in Fig. 2) might be varied, as two or more depending straps or hooks without straps might be used for fastening the apron to the lower edge of the dash, the essential feature of my invention being to construct a storm-apron adapted to pass over the dash and connect with its lower edge.

If preferred, the apron can be attached to both the bottom and top edges of the dash by putting a spring-clasp at the top and bottom ends of the straps and forming the straps of elastic material.

Having fully described my invention, what I claim as new, and desire to secure by Letters Patent, is—

1. A storm-apron for vehicles, constructed to extend over the dash, and provided with a hook arranged to depend from the apron and be secured at the lower edge of the dash, substantially as set forth.

2. A storm-apron provided with the converging-straps, and hook attached to their lower ends and adapted to be secured at the lower edge of the dash, substantially as set forth.

3. A storm-apron provided with the straps C C, the hook E, secured to the lower ends of the straps, and the elastic gathering-strap E', substantially as set forth.

In testimony whereof I have signed this specification in the presence of two subscribing witnesses.

CORYDON C. KING.

Witnesses:
S. D. KING,
F. C. MOSIER.